(12) United States Patent
Naka et al.

(10) Patent No.: US 6,649,562 B2
(45) Date of Patent: Nov. 18, 2003

(54) METHANOL-DECOMPOSING CATALYST AND METHANOL-DECOMPOSING APPARATUS COMPRISING SAME

(75) Inventors: Takahiro Naka, Saitama-ken (JP); Hideaki Sumi, Saitama-ken (JP); Kazuhito Matsuda, Saitama-ken (JP); Shoji Isobe, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,761

(22) Filed: Nov. 18, 1999

(65) Prior Publication Data

US 2003/0148880 A1 Aug. 7, 2003

(30) Foreign Application Priority Data

Nov. 18, 1998 (JP) .............................. 10-328600

(51) Int. Cl.⁷ .............................. B01J 23/06; B01J 23/72
(52) U.S. Cl. ...................... 502/343; 502/304; 502/345; 502/349; 502/350
(58) Field of Search ................. 502/304, 343, 502/345, 349, 350; 423/213.2, 650, 651; 252/373

(56) References Cited

U.S. PATENT DOCUMENTS

| | | |
|---|---|---|
| 4,501,823 A | 2/1985 | Masuda |
| 4,579,995 A | 4/1986 | Mauldin |
| 4,743,576 A | 5/1988 | Schneider et al. |
| 4,847,000 A | 7/1989 | Dang Vu et al. |
| 4,906,602 A | 3/1990 | Schneider et al. |
| 4,946,667 A | 8/1990 | Beshty |
| 5,665,668 A | 9/1997 | Grigorova et al. |
| 5,733,837 A | 3/1998 | Nakatsuji et al. |
| 5,895,772 A | 4/1999 | Grigorova et al. |
| 6,051,163 A | 4/2000 | Krumberger et al. |

FOREIGN PATENT DOCUMENTS

JP  4-122444  4/1992

*Primary Examiner*—Tom Dunn
*Assistant Examiner*—Christina Ildebrando
(74) *Attorney, Agent, or Firm*—Arent Fox Kintner Plotkin & Kahn PLLC

(57) ABSTRACT

A methanol-decomposing catalyst comprises catalytically active components containing copper and zinc, and a carrier composed of zirconia and/or titania and ceria for supporting the catalytically active components. The methanol-decomposing catalyst has excellent catalytic activity, thereby efficiently producing a hydrogen gas while suppressing side reactions.

10 Claims, 4 Drawing Sheets

METHANOL-DECOMPOSING CATALYST AND METHANOL-DECOMPOSING APPARATUS COMPRISING SAME

BACKGROUND OF THE INVENTION

The present invention relates to a catalyst for efficiently decomposing methanol to produce hydrogen and an apparatus comprising such a methanol-decomposing catalyst.

Though most of energy sources for automobiles have conventionally been petroleum fuels such as gasoline, diesel oil, etc., alternative energy sources have been attracting much attention in view of the depletion of petroleum oil and various environmental problems such as warming of global climate, acid rain, etc. Such alternative energy sources are non-petroleum engine fuels such as a natural gas and methanol, and batteries and fuel cells for electric vehicles, and some of them have already been practically used.

Engines running with non-petroleum fuels such as a natural gas and methanol are advantageous in less emission of $CO_2$ and noxious gases such as $NO_x$ than the gasoline or diesel engines. However, the non-petroleum fuels are still derived from limited sources of fossil fuels.

Electric vehicles free from the problems of burning fuels generally run with excellent energy efficiency without emission of exhaust gas polluting the environment. However, the electric vehicles running by batteries are disadvantageous in many respects such as limited distance covered by one charge and a long charging time of batteries, which should be solved for cars running streets.

In view of such circumstances, the electric vehicles running with fuel cells utilizing an electrochemical reaction between hydrogen and oxygen have attracted much attention as alternatives to the prevalent engine vehicles. The electric vehicles with fuel cells are advantageous in energy efficiency free from the problems of exhaust gas. However, a hydrogen gas should be carried and supplied safely and efficiently in the fuel cells. It is thus recently proposed that methane or methanol is used as a hydrogen gas source to be decomposed to generate a hydrogen gas while running. In particular, methanol is most promising as a hydrogen gas source, because methanol is in a state of liquid that can easily be stored in a tank and supplied like gasoline.

When methanol is decomposed to produce a hydrogen gas, the following reactions:

$CH_3OH \rightarrow HCHO+H_2$, and $HCHO+H_2O \rightarrow CO_2+2H_2$ mainly occur with inevitable side reactions generating by-products such as carbon monoxide. Because a gas produced by methanol decomposition is directly introduced into a fuel cell, the methanol decomposition gas should have as high a hydrogen concentration as possible with minimum concentrations of by-products and unreacted methanol.

The amount of a hydrogen gas required changes depending on whether or not and how automobiles are accelerated, leading to change in the amount of a fuel to be decomposed such as methanol and thus the temperature of the catalyst in a range of 200 to 600° C. Accordingly, the methanol-decomposing catalyst should have activity that little lowers for a long period of use in such a temperature range, and high thermal stability. Further, the methanol-decomposing catalyst should be maintenance-free because it is used on vehicles.

Conventionally known as such methanol-decomposing catalysts are (a) catalysts produced by compressing catalytically active components such as oxides of copper, zinc, etc. into pellets with binders such as graphite; and (b) catalysts comprising noble metals such as palladium as catalytically active components. However, the catalysts (a) palletized with graphite do not have sufficiently large contact area with methanol, failing to achieve efficient decomposition of methanol in a small catalyst amount. The catalysts (b) comprising noble metals such as palladium as catalytically active components are poor in selectivity for generating hydrogen.

Both catalysts suffer from the problem that the resultant gas does not contain a sufficiently high concentration of a hydrogen gas while containing relatively large amounts of by-products such as CO, etc. Thus, it is difficult to make smaller a methanol-decomposing apparatus for generating a hydrogen gas that is to be supplied to a fuel cell.

OBJECT AND SUMMARY OF THE INVENTION

Accordingly, an object of the present invention is to provide a methanol-decomposing catalyst having excellent durability at widely changeable temperatures for efficiently producing a reaction gas having a high hydrogen gas concentration with sufficiently suppressed by-products, and a methanol-decomposing apparatus comprising such a catalyst.

As a result of intense research in view of the above object, the inventors have found that a methanol-decomposing catalyst comprising catalytically active components comprising copper and zinc, and a carrier for supporting the catalytically active components and composed of zirconia and/or titania together with ceria can efficiently decompose methanol to produce a hydrogen gas while sufficiently suppressing undesired side-reactions. The present invention has been completed based upon this finding.

The methanol-decomposing catalyst according to the present invention comprises catalytically active components of copper and zinc supported by a carrier composed of zirconia and/or titania together with ceria. Ceria added to the carrier acts to suppress the side reactions, contributing to efficient production of a hydrogen gas.

The ceria content is preferably 5 weight % or more based on the -carrier to sufficiently suppress the side reactions. Copper and zinc are preferably present in the form of oxide on the carrier. To achieve high efficiency in the production of a hydrogen gas, a weight ratio of copper/zinc is preferably  to 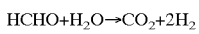 on an oxide basis.

The methanol-decomposing apparatus according to the present invention comprises the above methanol-decomposing catalyst and a means made of ceramics or metals for supporting the catalyst.

DETAILED DESCRIPTION OF THE PREFERRED EMBODIMENTS

[1] Methanol-decomposing Catalyst

Figure 1:
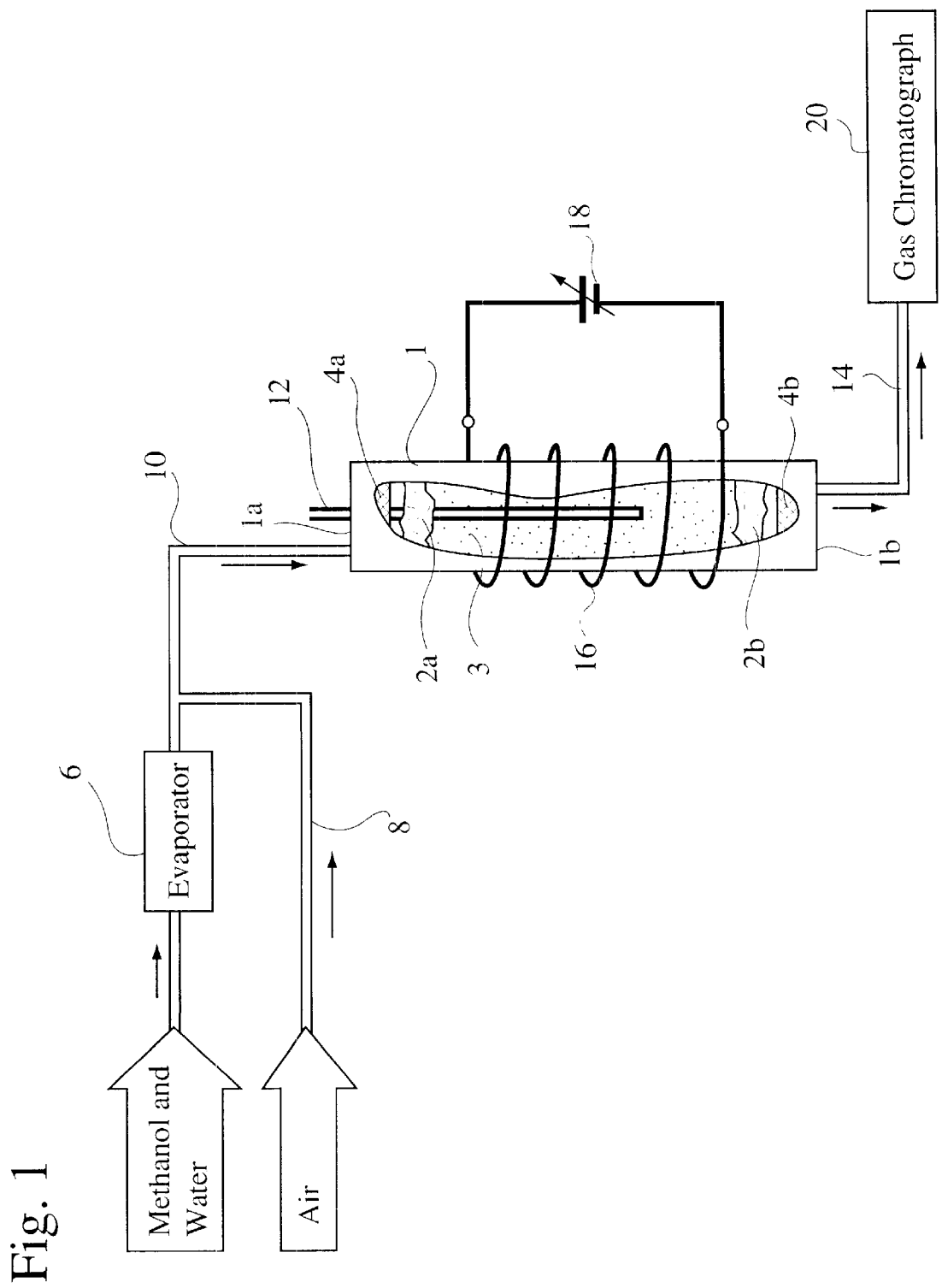
FIG. 1 is a partially cross-sectional, side view showing an apparatus for methanol-decomposing experiment.

The methanol-decomposing catalyst of the present invention comprises catalytically active components comprising copper and zinc and a carrier composed of zirconia and/or titania together with ceria for supporting the catalytically active components.

(1) Catalytically Active Components

The catalytically active components in the methanol-decomposing catalyst of the present invention comprise copper and zinc. These metals are usually present in the form of oxide on the carrier. A weight ratio of copper/zinc is preferably $1/10$ to $10/1$, more preferably $1/2$ to $2/1$ on an oxide basis.

(2) Carrier

The carrier in the methanol-decomposing catalyst of the present invention is composed of zirconia and/or titania together with ceria. Zirconia and titania are preferably in the form of fine powder having an average diameter of 1 to 50 μm, more preferably 5 to 10 μm.

The ceria content is preferably 5 weight % or more based on 100 weight % of the entire carrier to sufficiently suppress the side reactions. When the ceria content exceeds 80 weight %, the catalytic activity slightly lowers. Therefore, the ceria content is preferably 5 to 80 weight %, more preferably 10 to 60 weight %. In the case of ceria+zirconia, it is preferable that the ceria content is 20 to 40 weight % while the zirconia content is 80 to 60 weight %. Also, in the case of ceria+titania, it is preferable that the ceria content is 30 to 50 weight % while the titania content is 70 to 50 weight %.

The use of such a carrier provides the methanol-decomposing catalyst with high activity and excellent selectivity. The reasons therefor are not necessarily clear, but it may be considered that copper oxide and zinc oxide as the catalytically active components are finely dispersed in a carrier composed of zirconia and/or titania together with ceria, exhibiting good interaction therebetween.

[2] Production of Methanol-decomposing Catalyst (1) Starting Materials for Catalyst To have a carrier support copper and zinc in the form of oxide, it is preferable to prepare an aqueous solution containing compounds of copper and zinc, from which catalyst precursors of copper and zinc are precipitated in the form of fine powder.

Water-soluble salts such as nitrates, sulfates, chlorides, etc. of copper and zinc are dissolved in water to provide an aqueous solution. Water-soluble salts of other metals (aluminum, etc.) than copper and zinc may also be added to the aqueous solution, if necessary. Alkaline salts such as NaOH, $NaHCO_3$, $Na_2CO_3$, etc. are added to the aqueous solution to coprecipitate the catalyst precursors of copper and zinc in the form of hydroxide, carbonate, etc., which are then filtered out.

(2) Supporting Catalytically Active Components

The resultant catalyst precursor powder of copper and zinc is mixed with zirconia and/or titania powder and ceria powder in a suitable amount of water in a ball mill, etc. to form a uniform slurry. After formed into pellets or applied to a proper support, the formed body is preferably baked at about 300 to 600° C., so that the catalyst precursors are converted to copper oxide and zinc oxide. The support may preferably be made of ceramics or metals, and it is preferably in the form of honeycomb from the aspect of gas penetration resistance.

[3] Methanol-decomposing Apparatus

The methanol-decomposing catalyst carried by a support such as a honeycomb support is disposed in a suitable casing. A methanol-decomposing apparatus is constituted by equipping the casing with a reactant-supplying pipe, a reaction gas-discharging pipe and a means for heating the support. Instead of carrying the methanol-decomposing catalyst by a support, the carrier supporting the catalytically active components may be compression-molded to pellets, which are filled in a suitable casing.

[4] Methanol-decomposing Method

Methanol is introduced into the methanol-decomposing apparatus together with air and water through the reactant-supplying pipe to cause a methanol-decomposing reaction therein. The temperature of the catalyst changes in a range of about 200 to 600° C. depending on acceleration and deceleration of the automobiles, and the methanol-decomposing catalyst of the present invention exhibits sufficiently high catalytic activity in this temperature range. Because the temperature of the catalyst is not sufficiently high at start of automobiles, the methanol-decomposing catalyst should be heated by the heater mounted to the methanol-decomposing apparatus. Combustion heat of methanol may preferably be utilized as a heat source.

The present invention will be explained in further detail by the following examples without intention of restricting the scope of the present invention defined by the claims attached hereto.

EXAMPLE 1

12.2 g of copper nitrate and 16.8 g of zinc nitrate were dissolved in 0.8 L of water. Introduced into the aqueous solution while stirring at 50° C. was an aqueous solution of sodium hydrogen carbonate in an amount of two times the stoichiometric amount, so that copper carbonate and zinc carbonate were precipitated in the solution. The solution was filtered to obtain solid components, which were then washed with water and dried to provide a mixture of copper carbonate and zinc carbonate as the precursors of the catalytically active components.

Zirconia powder (purity: 98% or more, average particle diameter: 5 μm) or titania powder (purity: 98% or more, average particle diameter: 4 μm) was mixed with ceria powder (purity: 98 % or more, average particle diameter: 4 μm) at weight ratios shown in Table 1 to produce carrier powder mixtures. Added to 90 g of each carrier powder mixture was 10 g of the above precursors consisting of copper carbonate and zinc carbonate, and the resultant mixture was ball-milled in a suitable amount of water to provide a uniform slurry. The slurry was filtered to obtain solid components, which were washed with water, dried, baked at 400° C. for 2 hours in the air, pulverized, and then classified to obtain methanol-decomposing catalyst particles having an average diameter of 0.5 to 1 mm (Sample No. 1-2). The resultant catalyst was measured with respect to the amounts of copper and zinc (on a metal basis) in the catalytically active components by emission spectroscopic analysis. The measurement results are shown in Table 1.

These processes were repeated with various formulations of carriers (zirconia or titania plus ceria) and catalytically active components (copper and zinc), to produce methanol-decomposing catalysts of Sample Nos. 1-3 to 1-7 and 2-2 to 2-7. These formulations are shown in Table 1.

COMPERATIVE EXAMPLE 1

EXAMPLE 1 was repeated except for using only zirconia instead of zirconia+ceria as a carrier to produce a methanol-decomposing catalyst (Sample No. 1-1). The resultant catalyst was measured with respect to the amounts of copper and zinc (on a metal basis) in the same manner as in EXAMPLE 1. The formulations of the catalyst are shown in Table 1.

COMPERATIVE EXAMPLE 2

EXAMPLE 1 was repeated except for using only titania instead of zirconia+ceria as a carrier to produce a methanol-decomposing catalyst (Sample No. 2-1). The resultant catalyst was measured with respect to the amounts of copper and zinc (on a metal basis) in the same manner as in EXAMPLE 1. The formulations of the catalyst are shown in Table 1.

COMPERATIVE EXAMPLE 3

EXAMPLE 1 was repeated except for using only ceria instead of zirconia+ceria as a carrier to produce a methanol-decomposing catalyst (Sample No. 3). The resultant catalyst was measured with respect to the amounts of copper and zinc (on a metal basis) in the same manner as in EXAMPLE 1. The formulations of the catalyst are shown in Table 1.

COMPERATIVE EXAMPLE 4

EXAMPLE 1 was repeated except for using alumina having an average particle diameter of 8 μm instead of zirconia+ceria as a carrier to produce a methanol-decomposing catalyst (Sample No. 4). The resultant catalyst was measured with respect to the amounts of copper and zinc (on a metal basis) in the same manner as in EXAMPLE 1. The formulations of the catalyst are shown in Table 1.

COMPERATIVE EXAMPLE 5

Added to catalytically active components containing copper and zinc was graphite as a binder in an amount of 30 weight % based on the catalyst. The resultant mixture was compression-molded into a disc-shaped methanol-decomposing catalyst with no carrier having a diameter of 15 mm and a thickness of 2 mm (Sample No. 5). The resultant catalyst was measured with respect to the amounts of copper and zinc (on a metal basis) in the same manner as in EXAMPLE 1. The formulations of the catalyst are shown in Table 1.

TABLE 1

Formulations of Methanol-Decomposing Catalysts

| Sample No. | Carrier[1] | | | | Catalytically Active Components[2] | |
|---|---|---|---|---|---|---|
| | $CeO_2$ | $ZrO_2$ | $TiO_2$ | $Al_2O_3$ | Cu | Zn |
| 1-1[3] | — | 100 | — | — | 2.6 | 2.4 |
| 1-2 | 5 | 95 | — | — | 2.5 | 2.5 |
| 1-3 | 10 | 90 | — | — | 2.5 | 2.6 |
| 1-4 | 20 | 80 | — | — | 2.5 | 2.7 |
| 1-5 | 40 | 60 | — | — | 2.3 | 2.5 |
| 1-6 | 60 | 40 | — | — | 2.5 | 2.6 |
| 1-7 | 80 | 20 | — | — | 2.5 | 2.6 |
| 2-1[4] | — | — | 100 | — | 2.5 | 2.7 |
| 2-2 | 5 | — | 95 | — | 2.6 | 2.4 |
| 2-3 | 10 | — | 90 | — | 2.5 | 2.6 |
| 2-4 | 20 | — | 80 | — | 2.5 | 2.7 |
| 2-5 | 40 | — | 60 | — | 2.4 | 2.6 |
| 2-6 | 60 | — | 40 | — | 2.5 | 2.6 |
| 2-7 | 80 | — | 20 | — | 2.3 | 2.5 |
| 3[5] | 100 | — | — | — | 2.5 | 2.3 |
| 4[6] | — | — | — | 100 | 2.6 | 2.6 |
| 5[7] | — | — | — | — | 32.0 | 36.0 |

Note: (1) Weight % based on the total amount (100 weight %) of the carrier.
(2) Weight % (on a metal basis) per the total amount (100 weight %) of the carrier.
(3) to (7) COMPARATIVE EXAMPLES 1–5, respectively.

The methanol-decomposing catalysts produced in EXAMPLE 1 (Sample Nos. 1-2 to 1-7 and 2-2 to 2-7) and COMPERATIVE EXAMPLES 1-5 (Sample Nos. 1-1, 2-1, and 3 to 5) were subjected to methanol decomposition experiments. An apparatus for the methanol decomposition experiments is shown in FIG. 1.

In FIG. 1, the apparatus has a glass tube 1 having an inner diameter of 9 mm, which is filled with a pair of glass-wool layers 2a, 2b and a methanol-decomposing catalyst layer 3 of 11.8 mm in height sandwiched by the glass-wool layers 2a, 2b, and seals 4a, 4b plugging the openings 1a, 1b of the glass tube 1. A reactant-supplying pipe 10 and a thermocouple 12 are inserted into the glass tube 1 through the upper seal 4a. The reactant-supplying pipe 10 is connected to an evaporator 6 to which methanol and water are supplied, and an air-introducing pipe 8. A reaction product-discharging pipe 14 is inserted into the glass tube 1 through the lower seal 4b and connected to a gas chromatograph 20. A heating wire 16 connected to a power source 18 is wound around the glass tube 1.

The methanol-decomposing reaction was performed by introducing a mixture of a methanol vapor, air and steam at 200° C. into the glass tube 1 through the pipe 10, while controlling the temperature of the catalyst by the heating wire 16 at such a level that the temperature of the glass tube 1 at an exit was kept at 300° C. The reaction conditions were as follows:

Reaction temperature: 300° C.,
Amount of the catalyst: 0.75 ml,
LHSV=10*,
Steam/methanol (mole ratio)=2.0,
Air/methanol (mole ratio)=0.72, and
Methanol-supplying rate: 7.5 ml/hour.

Note: "LHSV=10" means that the amount of methanol decomposed in an hour was ten times that of the catalyst.

The reaction product gas was analyzed by the gas chromatograph 20 to determine a methanol conversion ratio R (%), and the concentrations (%) of hydrogen and ether in the reaction product gas. The methanol conversion ratio R was calculated by the following equation:

$$R/100\ (\%) = 1 - [CH_3OH]/\{[CO_2] + [CO] + [CH_3OH]\},$$

wherein, $[CH_3OH]$, $[CO_2]$ and $[CO]$ represent the concentrations of unreacted methanol, carbon dioxide and carbon monoxide, respectively, in the reaction product.

Figure 2:
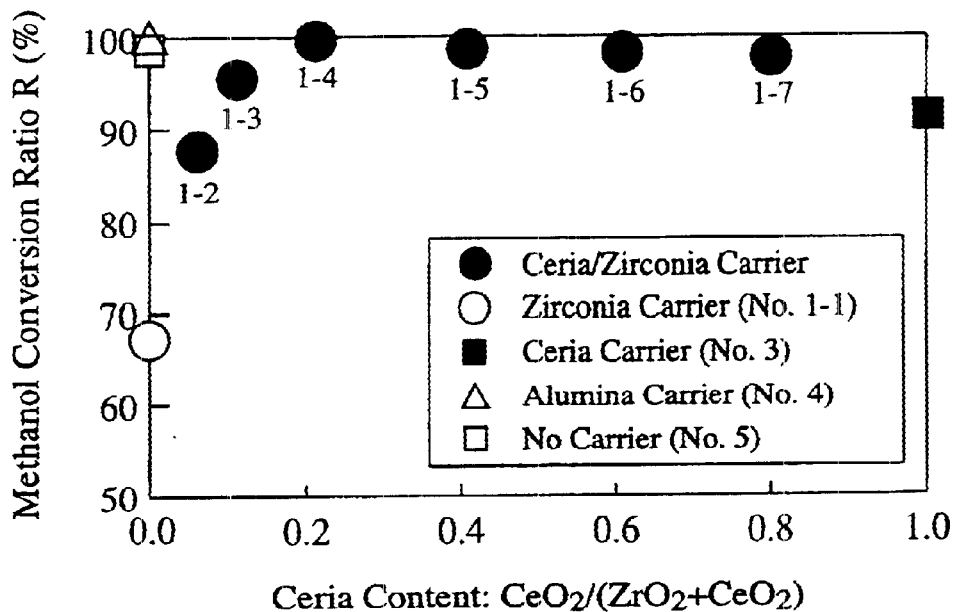
FIG. 2 is a graph showing the relation between the ceria content and the conversion ratio R of methanol in the methanol decomposition gas produced in the presence of the methanol-decomposing catalysts comprising a ceria/zirconia carrier and the methanol-decomposing catalysts of COMPERATIVE EXAMPLES, respectively.
Figure 3:
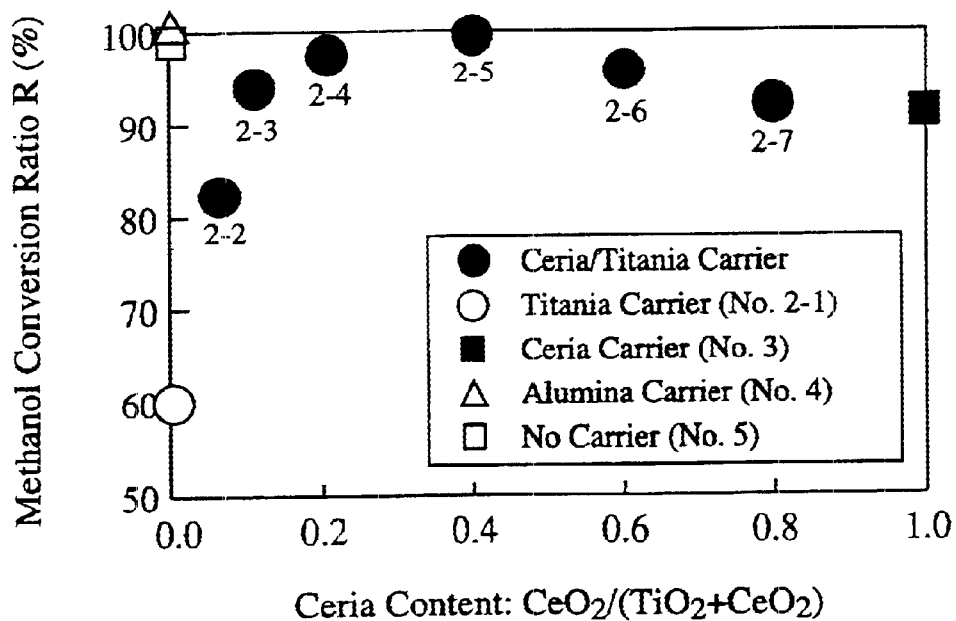
FIG. 3 is a graph showing the relation between the ceria content and the conversion ratio R of methanol in the methanol decomposition gas produced in the presence of the methanol-decomposing catalysts comprising a ceria/titania carrier and the methanol-decomposing catalysts of COMPERATIVE EXAMPLES, respectively.
Figure 4:
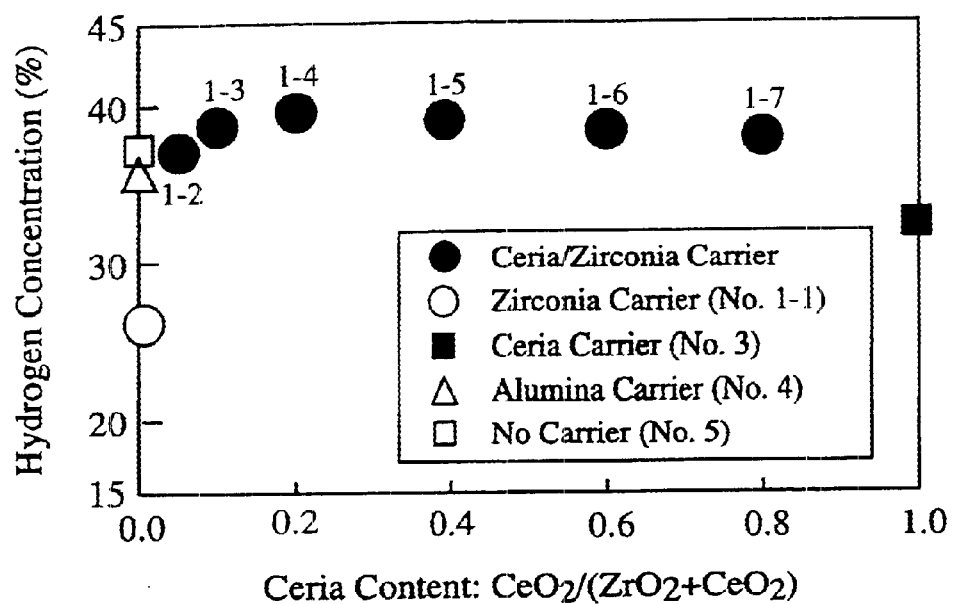
FIG. 4 is a graph showing the relation between the ceria content and the hydrogen concentration in the methanol decomposition gas produced in the presence of the methanol-decomposing catalysts comprising a ceria/zirconia carrier and the methanol-decomposing catalysts of COMPERATIVE EXAMPLES, respectively.
Figure 5:
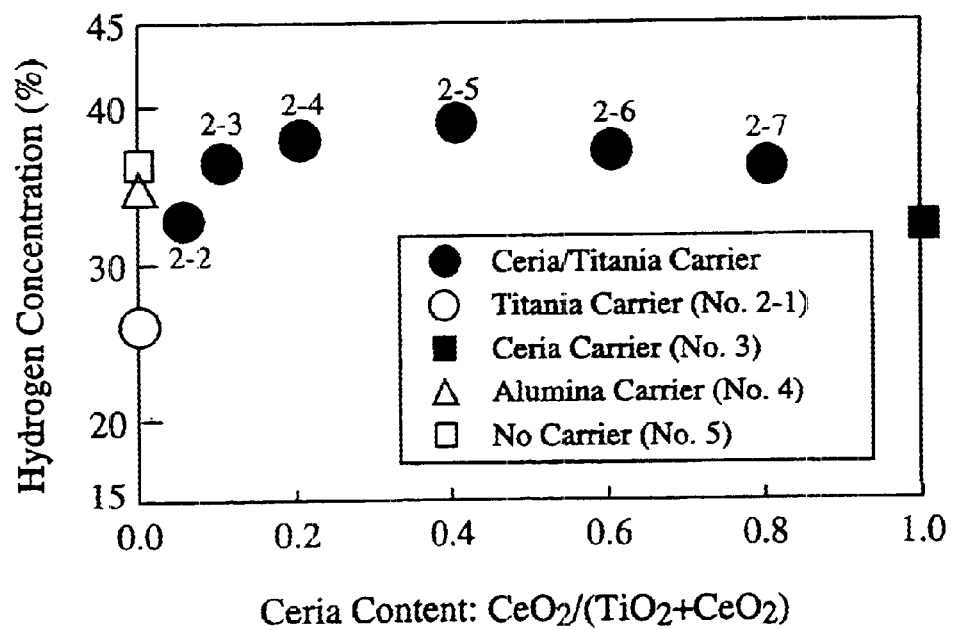
FIG. 5 is a graph showing the relation between the ceria content and the hydrogen concentration in the methanol decomposition gas produced in the presence of the methanol-decomposing catalysts comprising a ceria/titania carrier and the methanol-decomposing catalysts of COMPERATIVE EXAMPLES, respectively.
Figure 6:
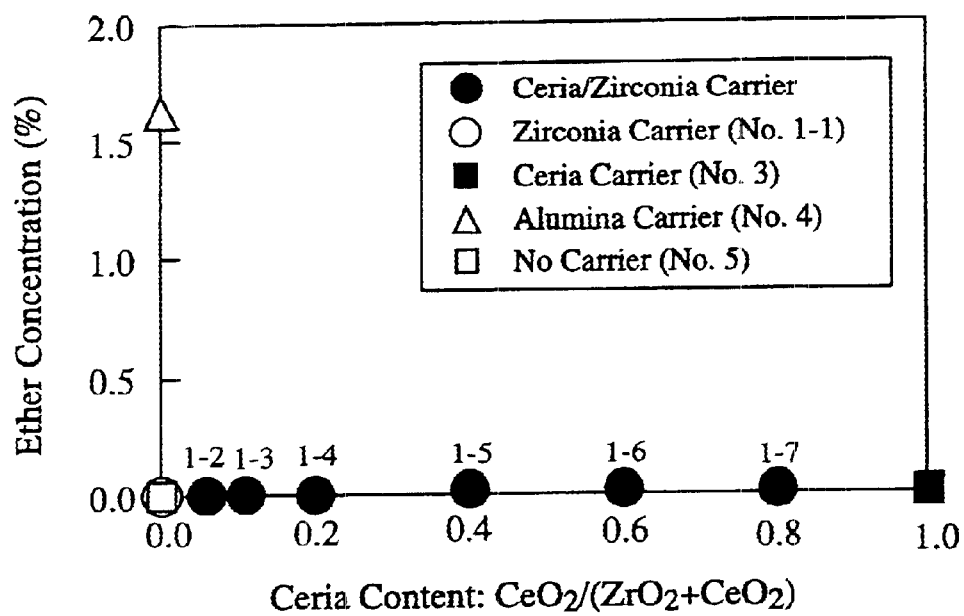
FIG. 6 is a graph showing the relation between the ceria content and the ether concentration in the methanol decomposition gas produced in the presence of the methanol-decomposing catalysts comprising a ceria/zirconia carrier and the methanol-decomposing catalysts of COMPERATIVE EXAMPLES, respectively.
Figure 7:
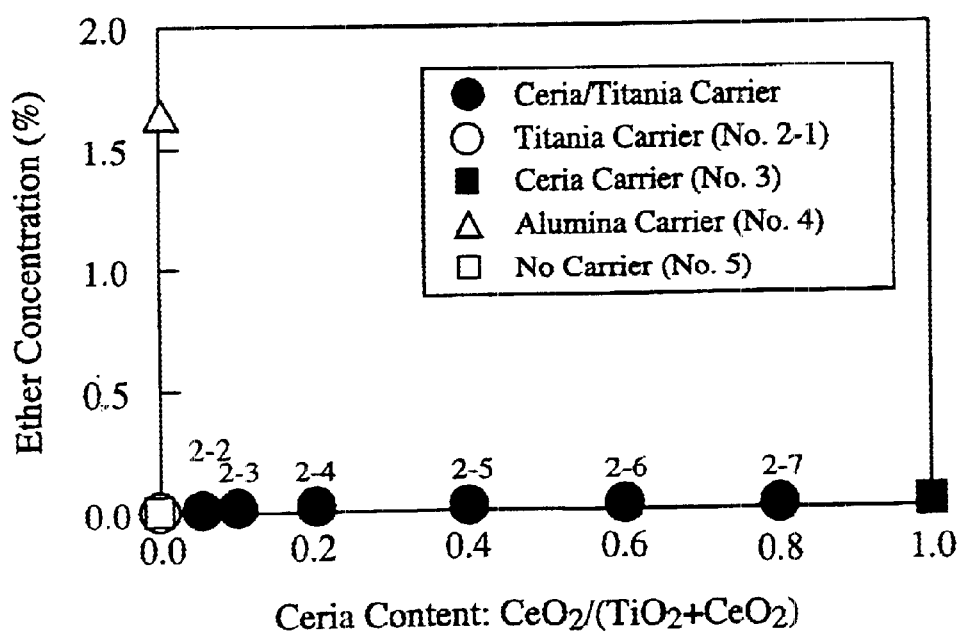
FIG. 7 is a graph showing the relation between the ceria content and the ether concentration in the methanol decomposition gas produced in the presence of the methanol-decomposing catalysts comprising a ceria/titania carrier and the methanol-decomposing catalysts of COMPERATIVE EXAMPLES, respectively.

The conversion ratio R of methanol, and the concentrations of hydrogen and ether in the resultant methanol decomposition gas are plotted against the ceria content in the case of using the catalysts of Sample Nos. 1-1 to 1-7 and 3 each comprising a ceria and/or zirconia carrier in FIGS. 2, 4 and 6, and in the case of using the catalysts of Sample Nos. 2-1 to 2-7 and 3 each comprising a ceria and/or titania carrier in FIGS. 3, 5 and 7.

Referring to FIGS. 2 and 4, the comparison of the catalysts of Sample Nos. 1-2 to 1-7 each comprising a ceria/zirconia carrier containing 5 weight % or more of ceria with the catalyst of Sample No. 1-1 containing no ceria revealed that the former were remarkably improved than the latter in a methanol conversion ratio R (Sample Nos. 1-2 to 1-7: 87 to 100 %, Sample No. 1-1: 67%) and a hydrogen concentration (Sample Nos. 1-2 to-1-7: about 40 %, Sample No. 1-1: 27%). Also, the methanol-decomposing catalyst of Sample No. 3 comprising a ceria carrier exhibited a slightly lower hydrogen concentration than those of the catalysts of Sample Nos. 1-2 to 1-7. Thus, it is confirmed that the ceria content in the ceria/zirconia carrier for the methanol-decomposing catalyst is preferably 5 to 80 weight %, more preferably 20 to 40 weight %.

Referring to FIGS. 3 and 5, the comparison of the catalysts of Sample Nos. 2-2 to 2-7 each comprising a ceria/titania carrier containing 5 weight % or more of ceria with the catalyst of Sample No. 2-1 containing only titania without ceria revealed that the former were remarkably improved than the latter in a methanol conversion ratio R (Sample Nos. 2-2 to-2-7: 82 to 100 %, Sample No. 2-1: 60 %) and a hydrogen concentration (Sample Nos. 2-2 to 2-7: 34 to 41 %, Sample No. 2-1: 26 %). Thus, it is confirmed that the ceria content in the ceria/titania carrier for the methanol-decomposing catalyst is preferably 5 to 80 weight %, more preferably 30 to 50 weight %.

In the case of the catalyst of Sample No. 4 (COMPARATIVE EXAMPLE 4) comprising an alumina carrier, the hydrogen concentration in the methanol decomposition product was slightly low, though the methanol conversion ratio R was high. In addition, ethers (mainly dimethyl ether) were produced with this catalyst (see FIGS. 6 and 7), meaning that the selectivity of the hydrogen-producing reaction is low in the case of using a catalyst comprising an alumina carrier. This suggests that side reactions take place to an unneglectful extent in addition to the methanol decomposition reaction on the alumina carrier, implying that alumina is not preferable as a carrier for the methanol-decomposing catalyst.

Further, the comparison of the methanol-decomposing catalysts of EXAMPLE 1 with that of COMPARATIVE EXAMPLE 5 (Sample No. 5) revealed that the amounts of the catalytically active components necessary in the former catalysts were as small as about 18 % of those of the latter catalyst. It is thus concluded that the addition of ceria to the carrier of zirconia and/or titania serves to drastically reduce the amounts of the catalytically active components in the methanol-decomposing catalysts.

As described above in detail, the methanol-decomposing catalyst of the present invention comprising catalytically active components containing copper and zinc and a carrier composed of zirconia and/or titania together with ceria is much more efficient in the decomposition of methanol to hydrogen while suppressing side reactions than the conventional methanol-decomposing catalysts. Because the methanol-decomposing catalyst of the present invention can efficiently decompose methanol in a small catalyst amount, a methanol-decomposing apparatus can be made small with high catalytic activity. Further, when the methanol-decomposing catalyst of the present invention is used in a temperature range of about 200 to 600° C. to which the catalyst may reach on automobiles for a long period of time, it exhibits a high thermal stability without much losing its catalytic activity. In addition, the methanol-decomposing catalyst of the present invention can be used maintenance-free.

What is claimed is:

1. A methanol-decomposing catalyst comprising catalytically active components consisting essentially of copper and zinc, and a carrier for supporting said catalytically active components, said carrier consisting essentially of zirconia and ceria, wherein a weight ratio of said zirconia to said ceria is from 95/5 to 60/40.

2. The methanol-decomposing catalyst according to claim 1, wherein copper and zinc are present in the form of oxide.

3. The methanol-decomposing catalyst according to claim 2, wherein a weight ratio of copper/zinc is 1/10 to 10/1 on an oxide basis in said catalytically active components.

4. The methanol-decomposing catalyst according to claim 1, wherein a weight ratio of copper/zinc is 1/10 to 10/1 on an oxide basis in said catalytically active components.

5. A methanol-decomposing apparatus comprising a methanol-decomposing catalyst and a support made of ceramics or metals for supporting said catalyst, said catalyst comprising catalytically active components consisting essentially of copper and zinc, and a carrier for supporting said catalytically active components, said carrier consisting essentially of zirconia and ceria, wherein a weight ratio of said zirconia to said ceria is from 95/5 to 60/40.

6. A methanol-decomposing catalyst comprising catalytically active components composed of copper and zinc, and a carrier for supporting said catalytically active components, said carrier consisting essentially of titania and ceria, wherein a weight ratio of said titania to said ceria is from 95/5 to 20/80.

7. The methanol-decomposing catalyst according to claim 6, wherein copper and zinc are present in the form of oxide.

8. The methanol-decomposing catalyst according to claim 7, wherein a weight ratio of copper/zinc is 1/10 to 10/1 on an oxide basis in said catalytically active components.

9. The methanol-decomposing catalyst according to claim 6, wherein a weight ratio of copper/zinc is 1/10 to 10/1 on an oxide basis in said catalytically active components.

10. A methanol-decomposing apparatus comprising a methanol-decomposing catalyst and a support made of ceramics or metals for supporting said catalyst, said catalyst comprising catalytically active components composed of copper and zinc, and a carrier for supporting said catalytically active components, said carrier being composed of titania and ceria, wherein a weight ratio of said titania to said ceria is from 95/5 to 20/80.

* * * * *